US008871043B2

(12) United States Patent  (10) Patent No.: US 8,871,043 B2
Okuda  (45) Date of Patent: Oct. 28, 2014

(54) MASKING METHOD USING MASKING JIG

(71) Applicant: Fanuc Corporation, Yamanashi (JP)

(72) Inventor: Mitsuhiro Okuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 25 days.

(21) Appl. No.: 13/692,100

(22) Filed: Dec. 3, 2012

(65) Prior Publication Data

US 2013/0186550 A1  Jul. 25, 2013

(30) Foreign Application Priority Data

Jan. 24, 2012 (JP) ................................ 2012-011891

(51) Int. Cl.
   B05B 1/28 (2006.01)
   B32B 38/18 (2006.01)
   B05B 15/04 (2006.01)

(52) U.S. Cl.
   CPC ........... B32B 38/1833 (2013.01); B05B 15/045 (2013.01)
   USPC ....................................................... 156/64

(58) Field of Classification Search
   CPC ...... B05B 1/28; B32B 37/12; B32B 37/1284; B32B 38/1833; B32B 38/1841; B32B 38/185; B32B 41/00; G05G 15/00
   USPC ................... 156/64, 351, 367, 368, 378, 379; 901/43, 50
   See application file for complete search history.

(56) References Cited

U.S. PATENT DOCUMENTS

2007/0281100 A1* 12/2007 Herre et al. ................. 427/407.1
2009/0025199 A1*  1/2009 Hariki et al. .................... 29/430
2013/0118689 A1   5/2013 Okuda

FOREIGN PATENT DOCUMENTS

| DE | 102012022054 A1 | 5/2013 |
| JP | 6-099118 A | 4/1994 |
| JP | 9141577 A | 6/1997 |
| JP | 9141578 A | 6/1997 |
| JP | 2000-070800 A | 3/2000 |
| JP | 2004-202348 A | 7/2004 |

OTHER PUBLICATIONS

Office Action mailed Oct. 14, 2013, corresponds to German patent application No. 102013000791.7.

* cited by examiner

*Primary Examiner* — George Koch
(74) *Attorney, Agent, or Firm* — Lowe Hauptman & Ham, LLP (57) ABSTRACT

A masking jig holding unit (31) holds a masking jig, a robot moves the masking jig to place on a temporary placement table, an object holding unit (21) holds an object, the robot moves and positions the object to face an application unit (35b) in a predetermined position and posture, the application unit applies an adhesive to a masking part of the object, the robot directs the masking part of the object downward, and moves the object to the temporary placement table, and the robot brings the object down to the masking jig that is placed on the temporary placement table, and pastes the masking jig to the masking part of the object.

8 Claims, 8 Drawing Sheets

MASKING METHOD USING MASKING JIG

RELATED APPLICATIONS

The present application claims priority from, Japanese Application No. 2012-011891, filed Jan. 24, 2012, the disclosure of which is hereby incorporated by reference herein in its entirety.

BACKGROUND OF THE INVENTION

1. Technical Field

The present invention relates to a masking method that is executed by a robot using a masking jig.

2. Description of Related Arts

Prior to applying a coating material to an object to be coated, upon covering the part not to be coated in advance, which is referred to as masking, it is common to attach masking tape, a masking jig, etc like, to the non-coating part. For example, Japanese Unexamined Patent Publication No. 2000-70800 discloses that "during coating work, when there is a portion not to be coated, a method of applying a masking material such as masking tape, etc., to that portion and then coating, and removing the masking tape after coating, is efficient."

A masking method using a masking sheet is also known. For example, Japanese Unexamined Patent Publication No. 2004-202348 discloses that "upon cleaning and coating of the machine body 1, a machine body hole 5 communicating with precision equipment such as an electronic component is covered with a masking sheet 10 having flexibility and adhesiveness and repeatedly usable, so as to protect the precision equipment from foreign matter such as cleaning liquid or coating material."

In addition, a technique of positioning a masking member by means of a magnet body is also known. For example, Japanese Unexamined Patent Publication No. 6-99118 discloses that "a mask can be positioned and fixed reliably so as not to move and drift on a predetermined surface on the object to be coated using a magnet body, and, also, by means of a simple configuration having only a magnet body, it is possible to position and arrange the mask and the object to be coated so as not to be mispositioned."

When a robot attaches a masking jig to a workpiece using an adhesive, it is necessary to make the masking jig and the pasting surface of the workpiece stick closely and evenly. It is difficult for a robot hand that performs pasting work by holding a masking jig to paste the masking jig to a workpiece with an even force in accordance with various shapes of the workpiece.

The present invention has been made in view of the above backgrounds, and it is therefore an object of the present invention to provide a masking method that makes it possible to paste a masking jig to a workpiece with an even force using a robot hand.

SUMMARY OF THE INVENTION

To achieve the above object, according to a first mode, a masking method by a robot system is provided, the robot system including a robot including a masking jig holding unit that holds a masking jig and an object holding unit that holds an object, an application unit that is provided in a predetermined position in a working area of the robot and applies an adhesive, and a temporary placement table that is provided in the working area of the robot, wherein the masking method comprises steps of: holding the masking jig that is prepared in the working area of the robot in advance by the masking jig holding unit of the robot; moving the masking jig to place the masking jig on the temporary placement table by the robot; holding the object that is prepared in the working area of the robot in advance by the object holding unit of the robot; moving and positioning the object to face the application unit in a predetermined position and posture by the robot; applying the adhesive to a masking part of the object by the application unit; directing the masking part of the object downward, and moving the object to the temporary placement table by the robot; and bringing the object down to the masking jig that is placed on the temporary placement table, and pasting the masking jig to the masking part of the object by the robot.

According to a second mode, a masking method by a robot system is provided, the robot system including a first robot including an object holding unit that holds an object, a second robot including a masking jig holding unit that holds a masking jig, an application unit that is provided in at least a predetermined position in a working area of the first robot and applies an adhesive, and a temporary placement table that is provided in a working area that is common between the first robot and the second robot, wherein the masking method comprises steps of holding the masking jig that is prepared in the working area of the second robot in advance by the masking jig holding unit of the second robot; moving the masking jig to place on the temporary placement table by the second robot; holding the object that is prepared in the working area of the first robot in advance by the object holding unit of the first robot; moving and positioning the object to face the application unit in a predetermined position and posture by the first robot; applying the adhesive to a masking part of the object by the application unit; directing the masking part of the object downward, and moving the object to the temporary placement table by the first robot; and bringing the object down to the masking jig that is placed on the temporary placement table, and pasting the masking jig to the masking part of the object by the first robot.

According to a third mode, a masking method by a robot system is provided, the robot system including a first robot including an object holding unit that holds an object, a second robot including a masking jig holding unit that holds a masking jig and having a common working area with the first robot, an application unit that is mounted on the second robot and applies an adhesive, and a temporary placement table that is provided in the common working area, wherein the masking method comprises steps of holding the masking jig that is prepared in the working area of the second robot in advance by the masking jig holding unit of the second robot; moving the masking jig to place on the temporary placement table by the second robot; holding the object that is prepared in the working area of the first robot in advance by the object holding unit of the first robot; moving the object and the masking jig relatively to position the object to face the application unit in a predetermined position and posture by the first robot and the second robot; applying the adhesive to a masking part of the object by the application unit; directing the masking part of the object downward, and moving the object to the temporary placement table by the first robot; and bringing the object down to the masking jig that is placed on the temporary placement table, and pasting the masking jig to the masking part of the object by the first robot.

According to a fourth mode, based on one of the second mode and the third mode, the second robot further includes a first detection unit that detects a holding error of the object held by the object holding unit of the first robot, and the masking method further includes, based on the holding error detected by the first detection unit, correcting at least one of a relative position and a relative posture between the application unit and the object.

According to a fifth mode, based on one of the second mode to the fourth mode, the first robot further includes a second detection unit that detects a holding error of the masking jig held by the masking jig holding unit of the second robot, and the masking method further includes, based on the holding error detected by the second detection unit, correcting at least one of a relative position and a relative posture between the masking jig and the object.

These objects, features, and advantages of the present invention and other objects, features, and advantages will become clearer from the detailed description of typical embodiments of the present invention shown in the accompanying drawings.

DETAILED DESCRIPTION

Embodiments of the present invention will be described below in detail with reference to the accompanying drawings. In the following drawings, the same members are assigned the same reference codes. The scale in these drawings is changed as appropriate for ease of explanation.

Figure 1:
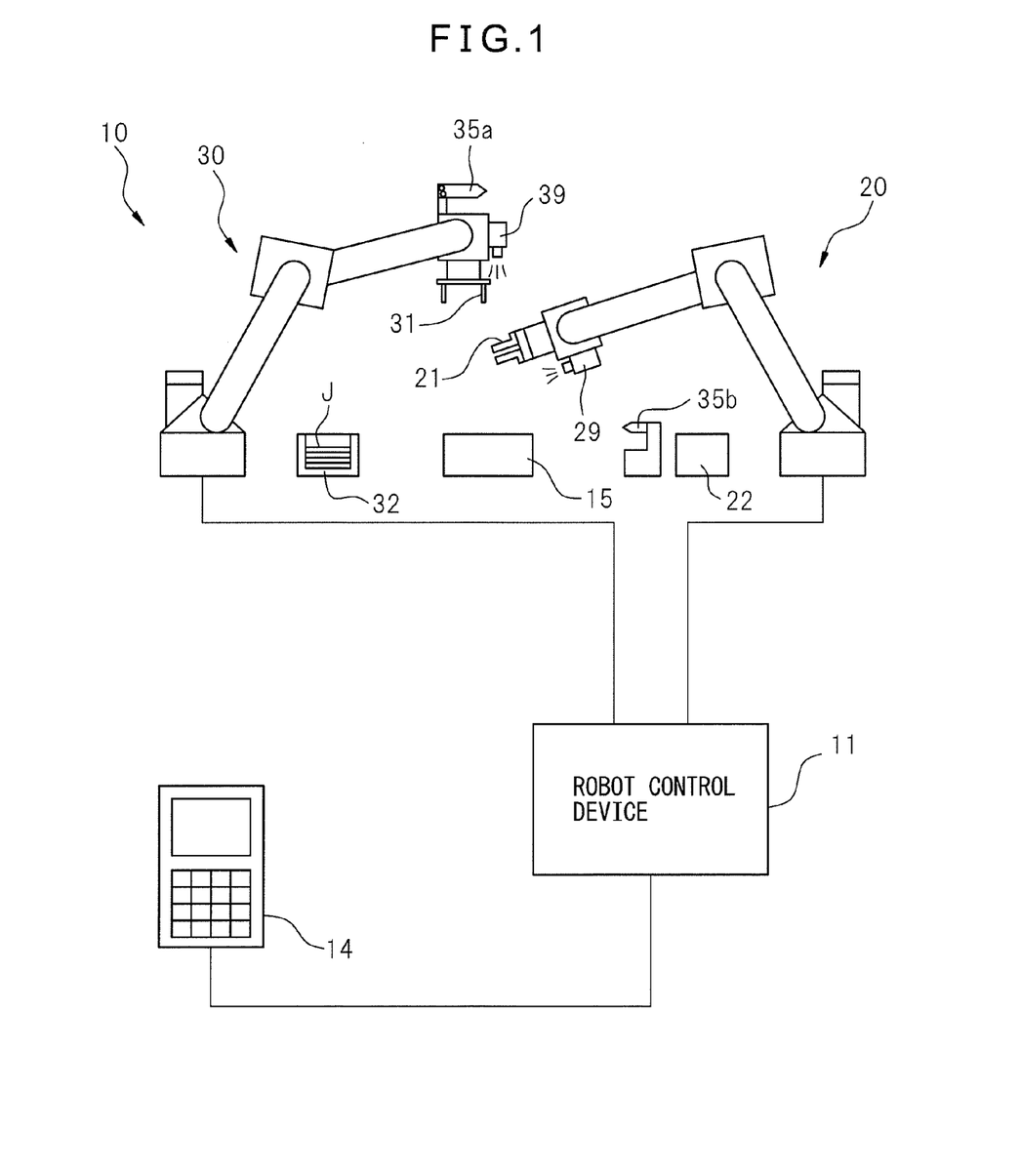
FIG. 1 is a diagram illustrating a robot system that executes the masking method based on the present invention.

FIG. 1 is a diagram illustrating a robot system that executes a masking method based on the present invention. As illustrated in FIG. 1, a robot system 10 includes a first handling robot 20 (hereinafter "first robot 20") having a hand 21, and a second handling robot 30 (hereinafter "second robot 30") having a hand 31. In FIG. 1, the first robot 20 and second robot 30 are articulated robot arms having six degrees of freedom.

As illustrated in this drawing, the first robot 20 and second robot 30 each have a detection unit—for example, cameras 29 and 39. These cameras 29 and 39 are connected to a robot controller 11 (which will be described below). Furthermore, the second robot 30 has, near its tip, an application unit 35a that applies an adhesive. Also, an application unit 35b to have the same function may be provided in a predetermined position in a working area of the first robot 20.

In FIG. 1, a temporary placement table 15 on which a masking jig J is placed, is illustrated. Assume that this temporary placement table 15 is placed in a working area that is common between the first robot 20 and second robot 30. Also, in the working area of the first robot 20, a workpiece placement area 22, in which at least one workpiece W is placed, is present in a predetermined position. Also, in a working area of the second robot 30, a masking jig placement area 32, where a plurality of masking jigs J are aligned and stacked on each other, is present in a predetermined position. The masking jigs J have a flat, planar shape of predetermined dimensions.

Furthermore, the robot system 10 includes a robot controller 11—for example, a digital computer—that controls the first robot 20 and second robot 30, and a teaching operation board 14 that is connected to the robot controller 11 and that performs teaching operations for the first robot 20 and second robot 30.

Figure 2:
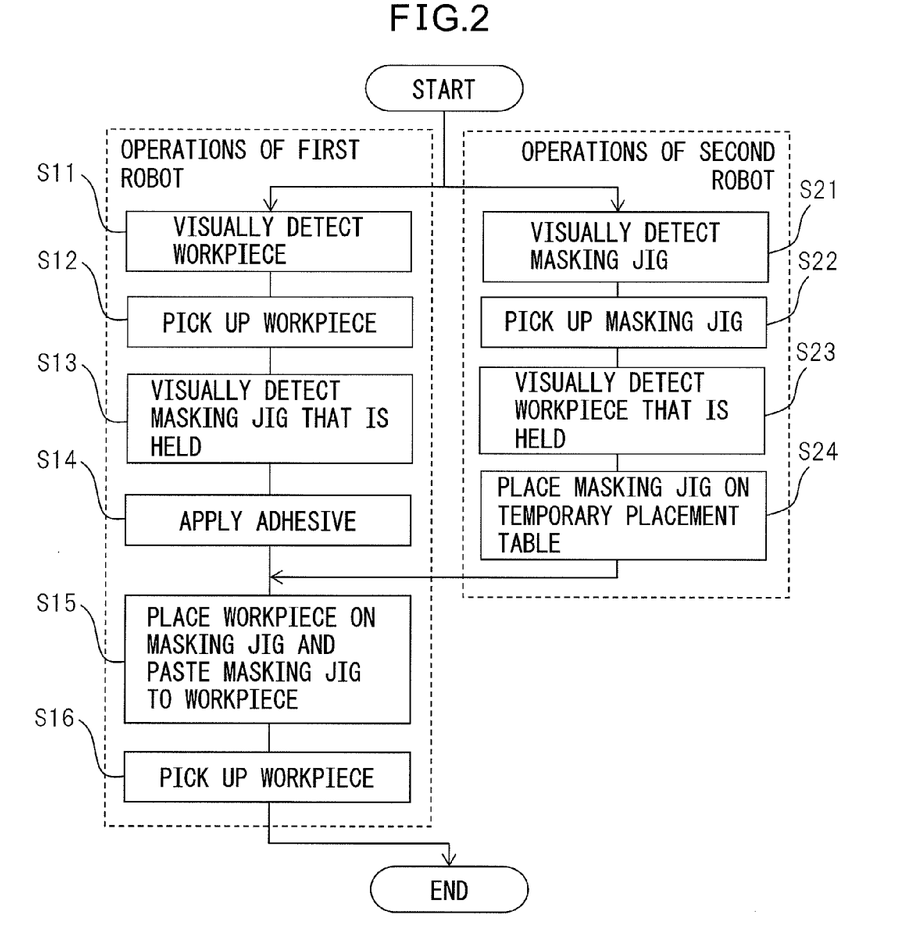
FIG. 2 is a flowchart illustrating the operation of robot system that executes the masking method of the present invention.

FIG. 2 is a flowchart illustrating the operations of the robot system that executes the masking method of the present invention. Furthermore, FIG. 3 to FIG. 12 are diagrams for explaining the masking method of the present invention. The masking method of the present invention will be described below with reference to these drawings.

Figure 3:
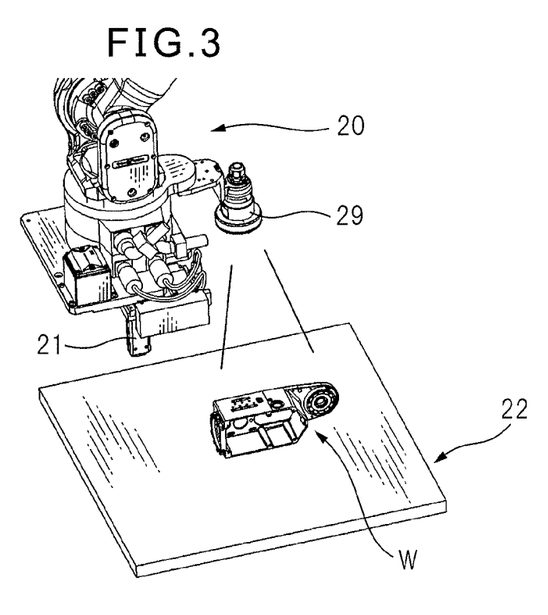
FIG. 3 is the first diagram for explaining the masking method of the present invention.

As can be seen from FIG. 2, the operations of the first robot 20 and the operations of the second robot 30 progress to parallel each other in certain parts, according to the masking method of the present invention. In step S11, as illustrated in FIG. 3, the first robot 20 is moved to the workpiece placement area 22, and the camera 29 of the first robot 20 detects the workpiece W placed in the workpiece placement area 22. By this means, the position and posture of the workpiece W in the workpiece placement area 22 can be learned.

Figure 4:
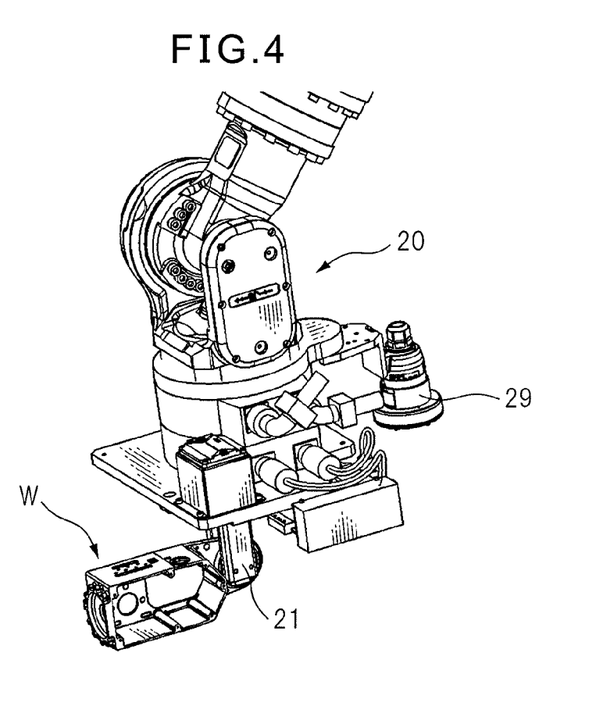
FIG. 4 is a second diagram for explaining the masking method of the present invention.

Then, in step S12, as illustrated in FIG. 4, the hand 21 of the first robot 20 holds the workpiece W based on the position and posture detected, and picks up the workpiece W from the workpiece placement area 22. As can be seen from FIG. 4 and so on, the hand 21 includes two hand members and holds the workpiece W by closing these hand members. However, the hand 21 may hold the workpiece W by other methods as well.

Figure 5:
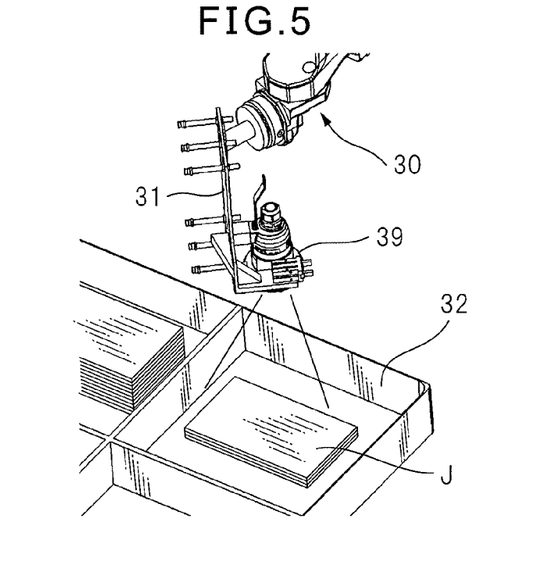
FIG. 5 is a third diagram for explaining the masking method of the present invention.

Likewise, in step S21, as illustrated in FIG. 5, the second robot 30 is moved to the masking jig placement area 32, and the camera 39 of the second robot 30 detects the masking jig J placed in the masking jig placement area 32. By this means, the position and posture of the masking jig J in the masking jig placement area 32 can be learned.

Figure 6:
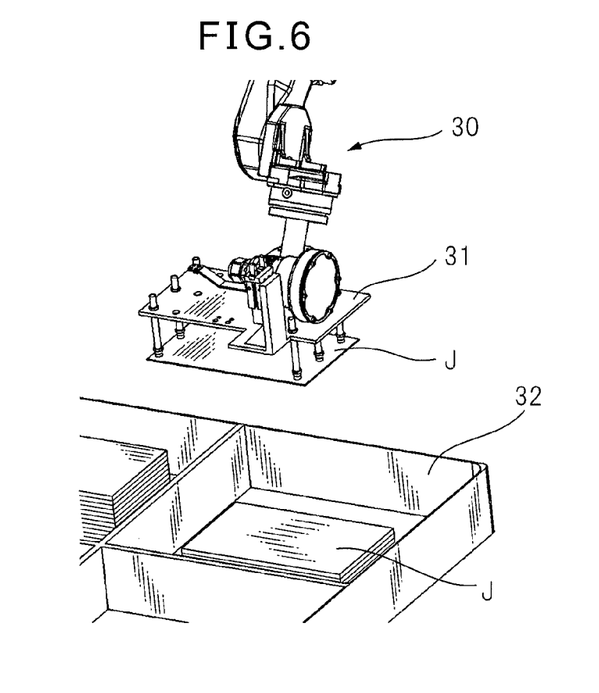
FIG. 6 is a fourth diagram for explaining the masking method of the present invention.

Then, in step S22, as illustrated in FIG. 6, the hand 31 of the second robot 30 holds the masking jig J based on the position and posture detected, and picks up the masking jig J from the masking jig placement area 32. As illustrated in FIG. 6, the hand 31 has a plurality of tubular suction units that are arranged to match the shape of the masking jig J. These tubular suction units suction and hold the masking jig J by a vacuum effect. However, the hand 31 may hold the masking jig J by other methods as well.

As can be seen from FIG. 5 and FIG. 6, a plurality of masking jigs J are aligned and stacked on each other in the masking jig placement area 32. Consequently, when the position of the masking jig J in the masking jig placement area 32 and the position of the masking jig placement area 32 itself are learned in advance, step S21 may be omitted.

Figure 7:
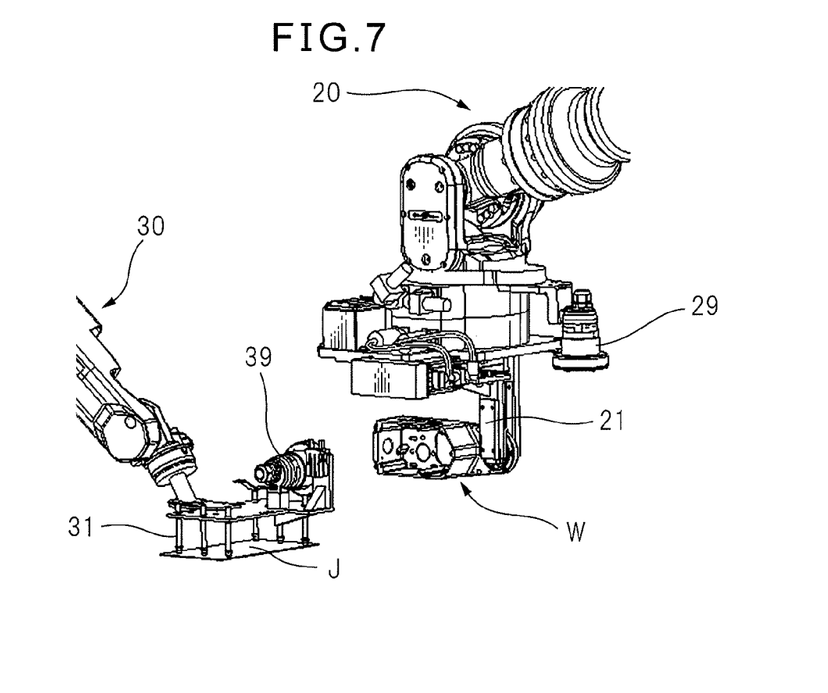
FIG. 7 is a fifth diagram for explaining the masking method of the present invention.

After that, in step S13, as illustrated in FIG. 7, the second robot 30 is moved, and the camera 39 of the second robot 30 is approached toward the workpiece W held by the hand 21 of the first robot 20. Then, the camera 39 of the second robot 30 photographs the workpiece W and its surroundings. By this means, it is possible to learn the position and posture relationships between the hand 21 and the workpiece W. Then, when the position and posture relationships between the hand 21 and the workpiece W have an error from the desired position and posture relationships, in step S14 (which will be described later), at least one of the relative position and the relative posture between the application unit 35b (or the application unit 35a) and the workpiece W is corrected by the amount of the error.

Figure 8:
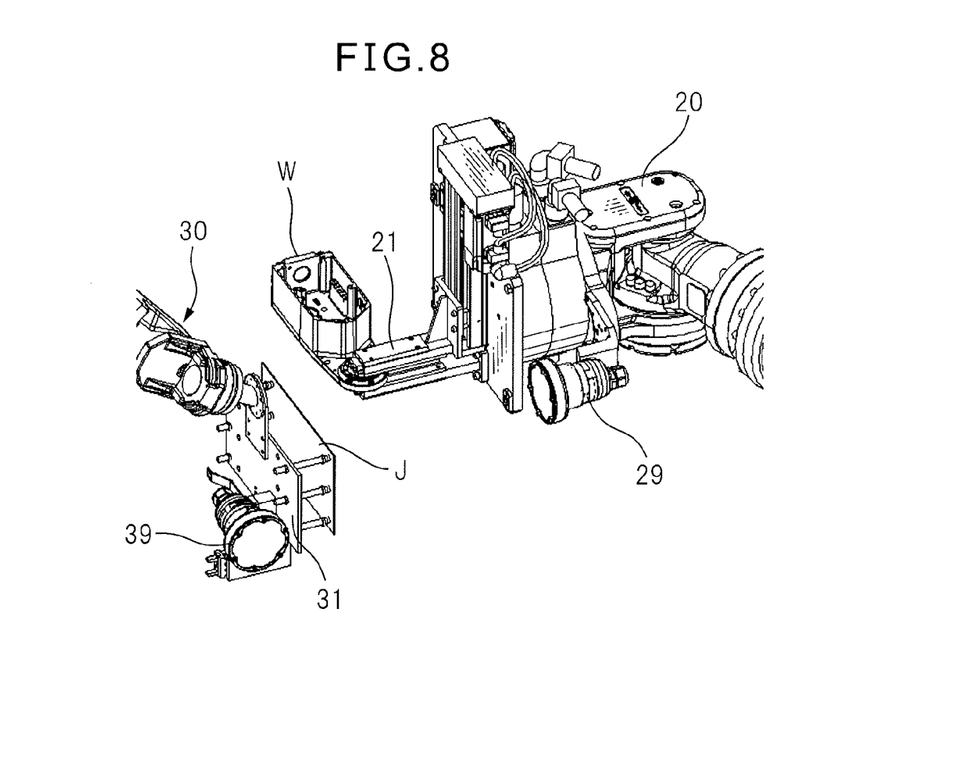
FIG. 8 is a sixth diagram for explaining the masking method of the present invention.

Likewise, in step S23, as illustrated in FIG. 8, the first robot 20 is moved, and the camera 29 of the first robot 20 is approached toward the masking jig J held by the hand 31 of the second robot 30. Then, the camera 29 of the first robot 20 photographs the masking jig J and its surroundings. By this means, it is possible to learn the position relationship between the hand 31 and the masking jig J. Then, when the position relationship between the hand 31 and the masking jig J have an error from the desired position relationship, in step S15 (which will be described below), at least one of the relative position and the relative posture between the masking jig J and the workpiece W is corrected by the amount of the error.

Figure 9:
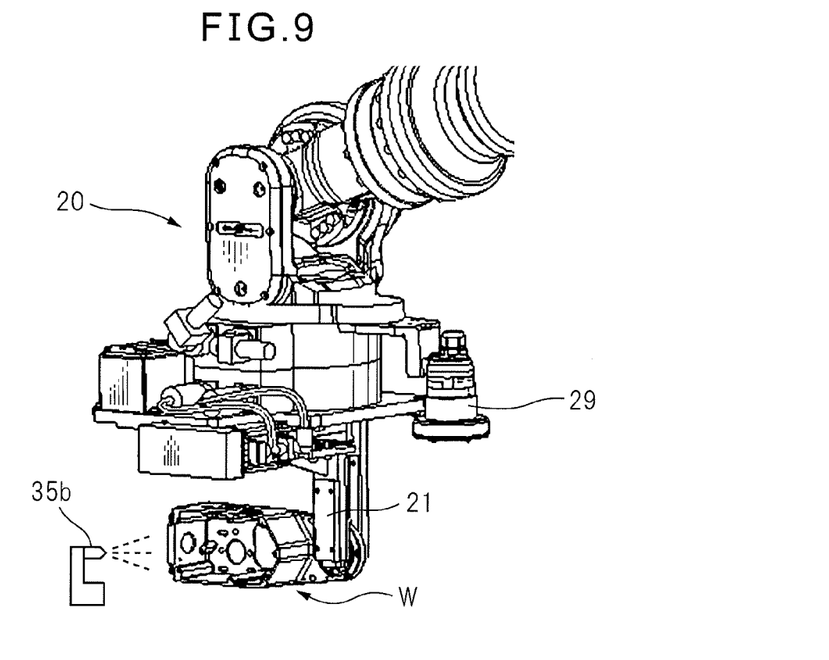
FIG. 9 is a seventh diagram for explaining the masking method of the present invention.

Then, in step S14, as illustrated in FIG. 9, the first robot 20 is moved so that the workpiece W is approached toward the application unit 35b. At this step, a predetermined masking part of the workpiece W is made to face the application unit 35b in predetermined position and posture relationships. Then, the application unit 35b is driven and it applies an adhesive to the masking part of the workpiece W.

Figure 10:
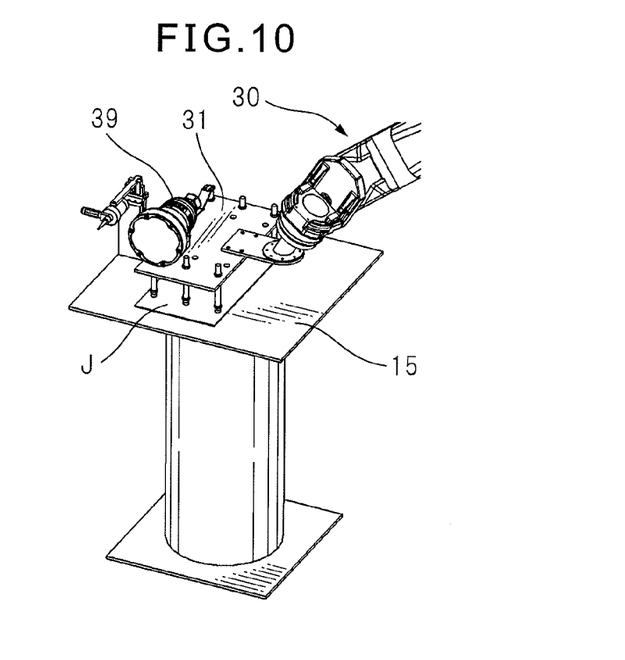
FIG. 10 is an eighth diagram for explaining masking method of the present invention.

Then, in step S24, as illustrated in FIG. 10, the second robot 30 is moved to the temporary placement table 15, and one whole surface of the masking jig J held by the hand 31 is made to contact the temporary placement table 15. Then, the hand 31 is released to mount the masking jig J on the temporary placement table 15. Since the operations of the second robot 30 are finished by these operations, the second robot 30 is brought back to its initial position.

Note that it is also possible to execute step S23 after step S24 is finished. However, in order to reduce the total working time, as illustrated in FIG. 2, it is preferable that the camera 39 of the second robot 30 photographs the workpiece W held by the hand 21 of the first robot 20 in the state in which the hand 31 holds the masking jig J.

Figure 11:
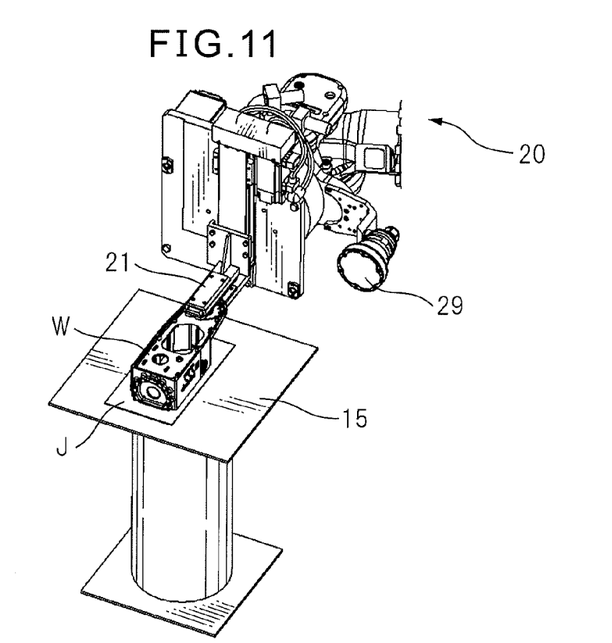
FIG. 11 is a ninth diagram for explaining the masking method of the present invention.

Then, in step S15, the first robot 20 directs the masking part of the workpiece W downward, moves the workpiece W to the temporary placement table 15 and positions the workpiece W right above the masking jig J. In this step, the masking part of the workpiece W and the masking jig J are made parallel to each other. Then, as illustrated in FIG. 11, the first robot 20 brings the workpiece W down to the masking jig J mounted on the temporary placement table 15. When the workpiece W reaches the temporary placement table 15, the masking jig J is pasted on the masking part of the workpiece W.

Figure 12:
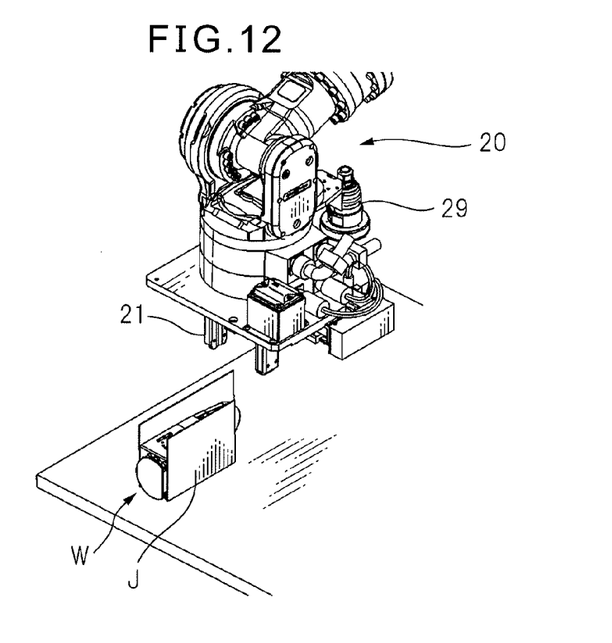
FIG. 12 is a tenth diagram for explaining the masking method of the present invention.

After that, in step S16, as illustrated in FIG. 12, while the workpiece W is held by the hand 21, the first robot 20 is moved from the temporary placement table 15 and placed in another place.

In this way, with the present invention, by putting the workpiece on the masking jig J that is placed in advance, the masking jig J is pasted to the workpiece. Consequently, the masking jig J is pressed by the weight of the workpiece W itself, and the workpiece W sticks to the masking jig J closely with an even force, so that it is possible to reliably paste the masking jig J.

Furthermore, as can be seen from FIG. 2, both the first robot 20 and second robot 30 are used with the present invention, so that the two robots can execute the steps assigned to each robot individually, at the same time. For example, while the first robot 20 is executing steps S11 and S12, the second robot 30 may execute steps S21 and S22. Consequently, compared to when a single robot is used, it is possible to reduce the total working time required to execute the masking method.

In addition, when an error in the position and posture relationships is detected in steps S13 and S23 of FIG. 2, the amount of the error is corrected. Consequently, it should be understood that, in step S16, it is possible to paste the masking jig J to the workpiece W more accurately.

In the embodiment described with reference to the drawings, an adhesive is applied to the workpiece W using the application unit 35b that is provided in a predetermined position. However, instead of using the application unit 35b, it is also possible to execute an operation of applying an adhesive in step S14 using the application unit 35a that is attached to the second robot 30. In this case, the second robot 30 needs to share a common working area with the first robot 20. In this case, the freedom of position and posture of the application unit 35a can be improved according to the shape of the object. In addition, to make the workpiece W face the application unit 35a, the first robot 20 and second robot 30 can both be moved. Consequently, it should be understood that the time required for the application work can be reduced.

Figure 13:
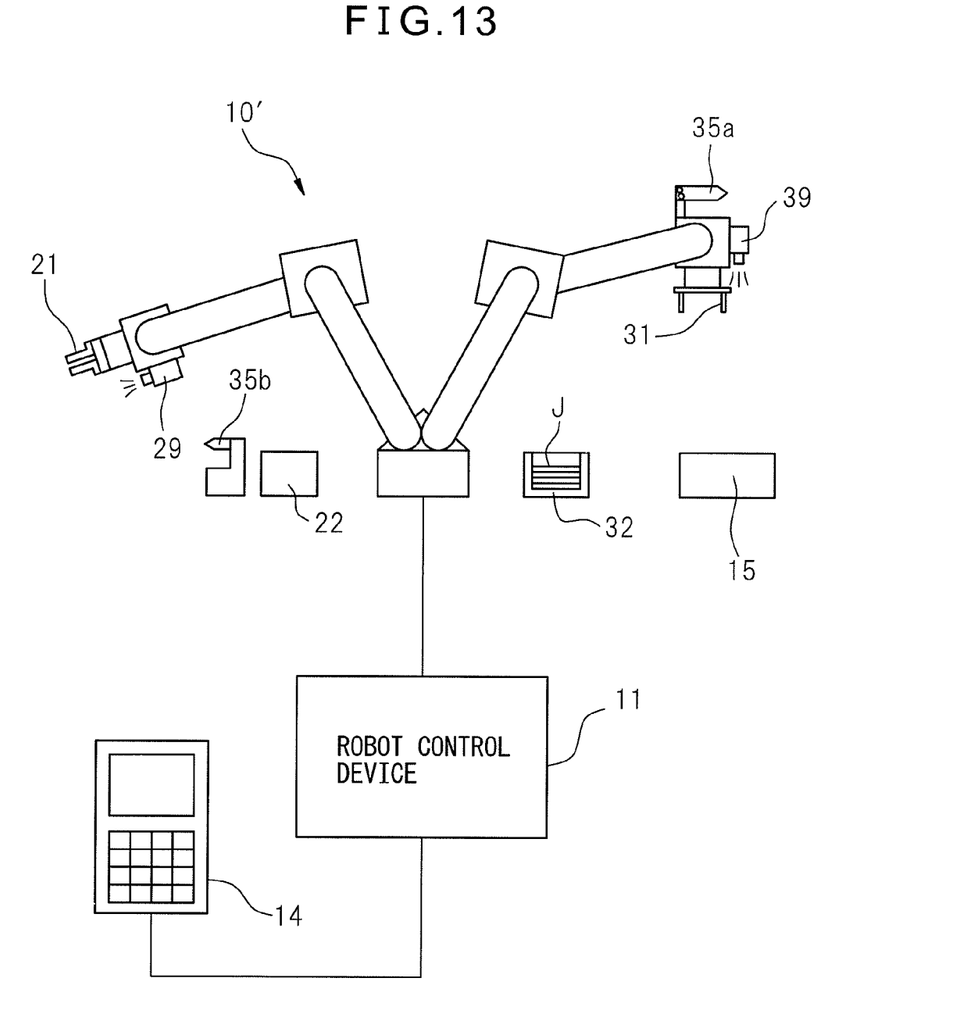
FIG. 13 is a diagram illustrating another robot system that executes the masking method based on the present invention.

Further, in FIG. 1, the robot system 10 includes two robots 20 and 30. FIG. 13 is a diagram illustrating another robot system that executes the masking method based on the present invention. As illustrated in FIG. 13, it is equally possible to use a single robot 10' that has the hand 21 for holding the workpiece W, and the hand 31 for holding the masking jig J. Assume that, in this case, the application unit 35b is provided in a working area of the single robot. In this case, since a single robot is used, and it should be understood that robot 10' can be controlled more simply.

EFFECTS OF THE INVENTION

According to the first mode, an object (workpiece) is put on a masking jig placed in advance and is pasted to the masking jig, so that the object presses the masking jig by its own weight and sticks closely to the masking jig with an even force, and it is possible to reliably paste the masking jig.

According to the second mode, an object (workpiece) is put on a masking jig placed in advance and is pasted to the masking jig, so that the object presses the masking jig by its own weight and sticks closely to the masking jig with an even force, and it is possible to paste the masking jig reliably. Furthermore, since two robots are used, it is possible to assign a number of steps to the two robots and reduce the total working time.

According to the third mode, an object (workpiece) is put on a masking jig placed in advance and is pasted to the masking jig, so that the object presses the masking jig by its own weight and sticks closely to the masking jig with an even force, and it is possible to paste the masking jig reliably. Furthermore, since a second robot has an application unit, it is possible to improve the freedom of position and posture of the application unit in accordance with the shape of the object.

According to the fourth mode, a first detection unit of the second robot detects the holding error of the object held by a first robot, so that it is possible to paste the masking jig on the object more accurately.

According to the fifth mode, a second detection unit of the first robot detects in advance the holding error—that is, the positioning error that may be produced upon mounting on the temporary placement table—of the masking jig that is held by the second robot, so that it is possible to paste the masking jig on the object more accurately.

Although the present invention has been described using typical embodiments, a person skilled in the art should understand that the above-described changes, and various other changes, omissions, and additions are possible without departing from the scope of the present invention.

The invention claimed is:

1. A masking method by a robot system, the robot system comprising a robot including a masking jig holding unit that holds a masking jig and an object holding unit that holds an object, an application unit that is provided in a predetermined position in a working area of the robot and applies an adhesive, and a temporary placement table that is provided in the working area of the robot, wherein the masking method comprises steps of:
   holding the masking jig that is prepared in the working area of the robot in advance by the masking jig holding unit of the robot;
   moving the masking jig to place it on the temporary placement table by the robot;
   holding the object that is prepared in the working area of the robot in advance by the object holding unit of the robot;
   moving and positioning the object to face the application unit in a predetermined position and posture by the robot;
   applying the adhesive to a masking part of the object by the application unit;
   directing the masking part of the object downward, and moving the object to the temporary placement table by the robot; and
   bringing the object down to the masking jig that is placed on the temporary placement table, and pasting the masking jig to the masking part of the object by the robot.

2. A masking method by a robot system, the robot system comprising a first robot including an object holding unit that holds an object, a second robot including a masking jig holding unit that holds a masking jig, an application unit that is provided in at least a predetermined position in a working area of the first robot and applies an adhesive, and a temporary placement table that is provided in a working area that is common between the first robot and the second robot, wherein the masking method comprises steps of:
   holding the masking jig that is prepared in the working area of the second robot in advance by the masking jig holding unit of the second robot;
   moving the masking jig to place on the temporary placement table by the second robot;
   holding the object that is prepared in the working area of the first robot in advance by the object holding unit of the first robot;
   moving and positioning the object to face the application unit in a predetermined position and posture by the first robot;
   applying the adhesive to a masking part of the object by the application unit;
   directing the masking part of the object downward, and moving the object to the temporary placement table by the first robot; and
   bringing the object down to the masking jig that is placed on the temporary placement table, and pasting the masking jig to the masking part of the object by the first robot.

3. A masking method by a robot system, the robot system comprising a first robot including an object holding unit that holds an object, a second robot including a masking jig holding unit that holds a masking jig and having a common working area with the first robot, an application unit that is mounted on the second robot and applies an adhesive, and a temporary placement table that is provided in the common working area, wherein the masking method comprises steps of:
   holding the masking jig that is prepared in the working area of the second robot in advance by the masking jig holding unit of the second robot;
   moving the masking jig to place on the temporary placement table by the second robot;
   holding the object that is prepared in the working area of the first robot in advance by the object holding unit of the first robot;
   moving the object and the masking jig relatively to position the object to face the application unit in a predetermined position and posture by the first robot and the second robot;
   applying the adhesive to a masking part of the object by the application unit;
   directing the masking part of the object downward, and moving the object to the temporary placement table by the first robot; and
   bringing the object down to the masking jig that is placed on the temporary placement table, and pasting the masking jig to the masking part of the object by the first robot.

4. The masking method according to claim 2, wherein, the second robot further includes a first detection unit that detects a holding error of the object held by the object holding unit of the first robot, and
   wherein the masking method further comprises, based on the holding error detected by the first detection unit, correcting at least one of a relative position and a relative posture between the application unit and the object.

5. The masking method according to claim 2, wherein, the first robot further includes a second detection unit that detects a holding error of the masking jig held by the masking jig holding unit of the second robot, and
   wherein the masking method further comprises, based on the holding error detected by the second detection unit, correcting at least one of a relative position and a relative posture between the masking jig and the object.

6. The masking method according to claim 3, wherein, the second robot further includes a first detection unit that detects a holding error of the object held by the object holding unit of the first robot, and
   wherein the masking method further comprises, based on the holding error detected by the first detection unit, correcting at least one of a relative position and a relative posture between the application unit and the object.

7. The masking method according to claim 3, wherein, the first robot further includes a second detection unit that detects a holding error of the masking jig held by the masking jig holding unit of the second robot, and
   wherein the masking method further comprises, based on the holding error detected by the second detection unit, correcting at least one of a relative position and a relative posture between the masking jig and the object.

8. The masking method according to claim 4, wherein, the first robot further includes a second detection unit that detects a holding error of the masking jig held by the masking jig holding unit of the second robot, and
   wherein the masking method further comprises, based on the holding error detected by the second detection unit, correcting at least one of a relative position and a relative posture between the masking jig and the object.

* * * * *